United States Patent Office 3,083,145
Patented Mar. 26, 1963

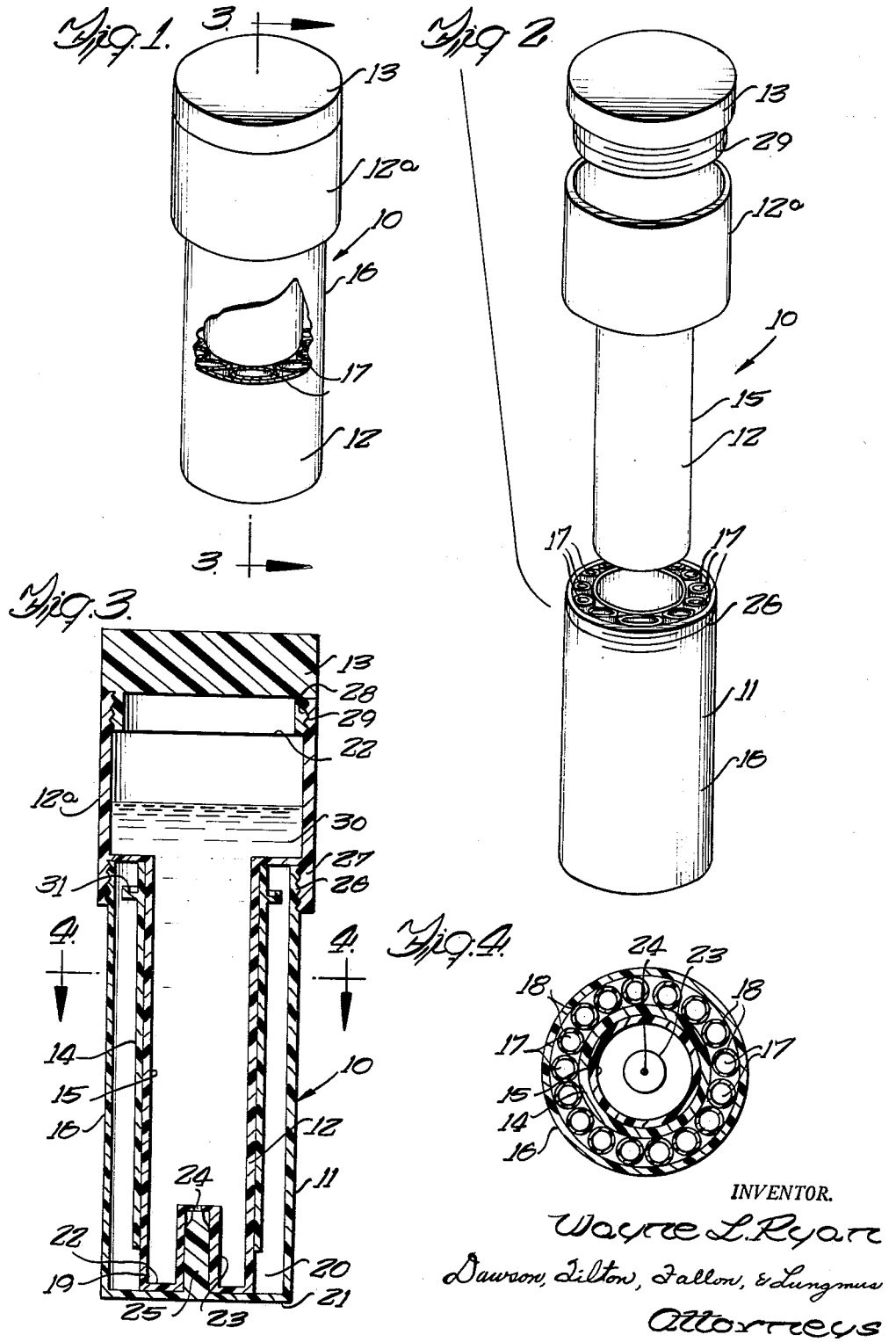

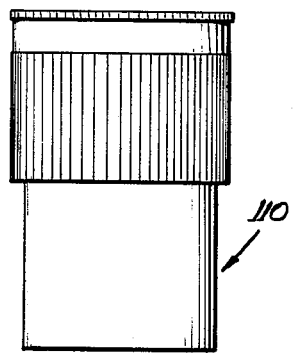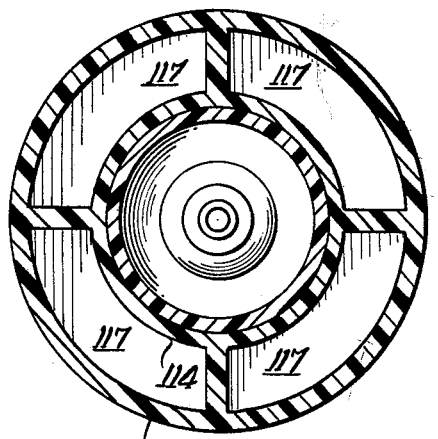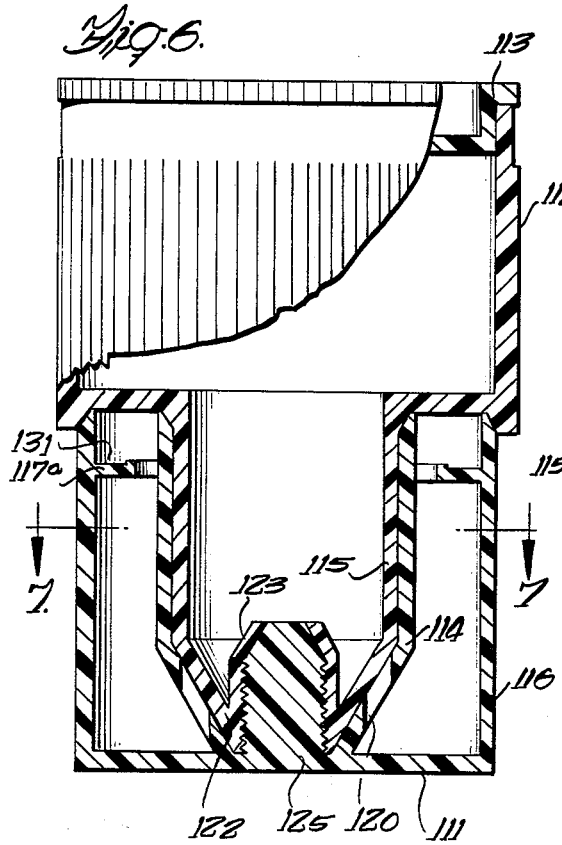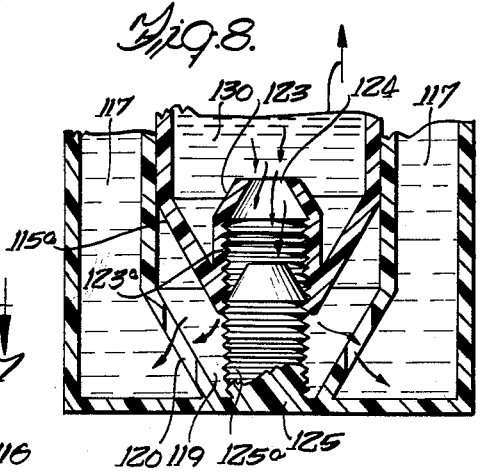

3,083,145
PROCESS AND DEVICE FOR DETERMINING THE SENSITIVITY OF BACTERIA TO ANTIBIOTICS
Wayne L. Ryan, Omaha, Nebr., assignor to Dundee Laboratories, Inc., Omaha, Nebr., a corporation of Nebraska
Filed Nov. 4, 1959, Ser. No. 850,794
18 Claims. (Cl. 195—103.5)

This invention relates to the determination of the sensitivity of bacteria to antibiotics and, more particularly, relates to a device which makes a quantitative comparison feasible without the use of heretofore-employed elaborate equipment.

Since the advent of antibiotics, concerted efforts have been made to devise tests for determining microbial susceptibility to specific antibiotics which could be used by clinicians as a reliable guide in selecting the most effective antibiotic for use in bacterial infections. Although the tube dilution and agar plate-antibiotic disc techniques have become standard tests in hospital laboratories, they have not been widely used in physicians' offices. There are many reasons for clinicians not adopting these techniques in office practice, but probably the most important are that the tests are too cumbersome, time-consuming, and relatively expensive.

It is a general object of this invention to provide a way for the clinician to compare the sensitivity of bacteria to various antibiotics which overcomes the problems and disadvantages characteristic of prior techniques.

Another object of this invention is to provide a device and method for determining the sensitivity of bacteria to antibiotics which is characterized by fast operation. Here, it is to be appreciated that quick results are of paramount importance, often a delayed result being of no value to the physician.

Still another object is to provide a method and means of testing bacterial sensitivity to antibiotics which is characterized by simplicity in operation. Prior expedients often involved delicate manipulative steps beyond merely inoculating a medium with the bacteria to be tested. Not only does this introduce the possibility of error, contamination, etc., but often meant that the test would be postponed until a more convenient time, so that its usefulness was diminished.

Yet another object is to provide a test for bacterial sensitivity to antibiotics and a device therefor which possesses novel accuracy in that it permits a quantitative determination of the effectiveness of the antibiotic. In previous procedures, the zone of inhibition was not necessarily related to the effectiveness of the antibiotic, but often was a measure of the solubility and diffusibility of the antibiotic. Where several antibiotics were available, a superior result in previous methods of testing did not always mean a more effective medicine.

A further object is to provide a means and method for determining the sensitivity of bacteria to antibiotics which is characterized by novel versatility. Now, it is possible to test not only qualitatively the bacterial sensitivity, but further to test the sensitivity to various concentrations of antibiotics and even further combinations of antibiotics.

The invention is explained in the accompanying drawings, which include—

FIG. 1 is a perspective view, partly broken away, of a device utilizing the invention;
FIG. 2 is an exploded view similar to FIG. 1;
FIG. 3 is a sectional view taken along the line 3—3 of FIG. 1;
FIG. 4 is a sectional view taken along the line 4—4 of FIG. 3;

FIG. 5 is an elevational view of a modified form of device embodying teachings of the invention;
FIG. 6 is an enlarged view similar to FIG. 5, partially broken away to show a portion in section;
FIG. 7 is a view taken along the line 7—7 of FIG. 6; and
FIG. 8 is a fragmentary sectional view of the device of FIG. 6 but in a different operative condition.

In the illustration given, the numeral 10 designates generally a device constructed of translucent plastic material and which is useful in providing a quantitative determination of the sensitivity of bacteria to various antibiotics. As is best seen in FIG. 2, the device 10 is seen to include an outer tubular member 11 which telescopingly receives an inner tubular member 12. The tubular member 12, at its upper end, is equipped with a screw cap 13.

The outer tubular member 11 is equipped with an inner wall 14 which preferably is in sliding, sealing relation with the outer wall 15 of the inner tubular member 12. The annular space between the inner wall 14 and the outer wall 16 of the outer tubular member 10 is divided into a plurality of compartments 17 (see FIG. 4) by divider elements 18. Each compartment or testing chamber 17 communicates at its lower end with the inner bottom 19 of the outer tubular member 12 by virtue of an aperture 20. The aperture 20 may be conveniently provided by terminating the inner wall 14 at its lower end a spaced distance above the bottom wall 21 of the outer tubular member.

In the illustration given, the inner tubular member 12 is also equipped with a bottom wall, this being designated by the numeral 22 and which has projecting upwardly therefrom a projection 23. The projection 23 is equipped with a flow opening 24 at its apex, and this is engaged by a solid projection 25 extending upwardly from the central bottom of the outer tubular member 11.

The outer wall 16 of the outer tubular member 11 is equipped with threads 26 adjacent its upper end, and the threads 26 mate with female threads 27 provided on an enlarged upper portion 12a of the inner tubular member 12.

Thus, when the inner tubular member 12 is received in the outer tubular member 11, as seen in FIG. 1, the threads 27 and 26 are engaged to seal off the open tops of the chambers 17. The extreme upper end of the portion 12a is equipped with female threads 28, and these are engaged by male threads 29 on the cap or plug closure 13. In the illustration given, the threads 26 and 27 are right-hand threads, while the threads 28 and 29 are left-hand threads.

The inner tubular member is seen to contain a liquid nutrient medium 30, while the chambers 17 have deposited therein an antibiotic 31. Associated with the deposit 31 is an indicator composition which changes color when bacterial growth occurs in its presence. In the operation of the device 10, provided in the form just described, the cap 13 is removed to permit inoculation of the nutrient medium 30 with the bacteria to be tested. At this time, the threads 26 and 27 are interengaged and the opening 24 is closed by the projection 25. If necessary, the bacteria can be cultured for some time to permit increase. Ordinarily, however, the distribution of the cultured medium can be performed right after inoculation. The replacement of the screw closure 13 permits shaking of the device 10 to insure uniform distribution of the bacteria in the medium, and thereafter the inner tubular member 12 is unscrewed from the outer tubular member 11. This exposes the open tops of the chambers 17 and also opens the valve-providing elements 24 and 25. When this has occurred, the cultured medium flows from the inner tubular member 12 into the chambers 17, delivering the same amount to each and at the same rate.

By providing the chambers 17 in an elongated and narrow form, any error in volume of liquid in each tube will be minimized even if the clinician does not hold the device in an exactly vertical position.

The threads 26 and 27 are subsequently engaged, after the liquid levels in the chambers 17 relative to the interior of the device 10, at which time the liquid in the chambers 17 is in engagement with the antibiotic-indicator deposit 31. If desired, the results can be read turbidimetrically, which is achieved when the indicator composition is omitted from the deposit 31. However, when a colorimetric determination of sensitivity is desired, this can be performed irrespective of whether the distribution of the inoculated medium is performed immediately or at some time later. Many specimens of infections are so small, or have so few bacteria in them, that it is impossible to obtain results without secondary plating. This has been one of the drawbacks of previous testing expedients. With the liquid medium used in the device herein described, the material can be more evenly distributed and, if necessary, the tube can be incubated for several hours to increase the number of bacteria before distributing the medium to the testing chambers 17. By providing the indicator in the testing chambers 17, no premature discoloration occurs, as might be the case if the indicator were provided in the medium itself.

Exemplary of an agent productive of discoloration upon bacterial growth, i.e., the indicator, is 2,3,5-triphenyl-2H-tetrozolium chloride. This oxidation-reduction indicator turns to a bright red color when in contact with growing bacteria. Optimum results are obtained when the concentration of the tetrazolium compound is in the order of 0.05% or less. Concentrations in excess of this percentage may tend to inhibit the bacterial growth. The optimum range of concentration of the indicator is 0.001% to 0.01%.

In order to provide more dependable operation and independent of the effect of air on the indicator, I employ a culture medium which is effective to lower the oxidation-reduction potential. Useful in this connection is thioglycollate culture media which is available both from the Difco Laboratories and the Baltimore Biological Laboratories. Use of this type of nutrient medium results in a much more rapid test. For example, thioglycollate inoculated with alpha-Streptococcus in the presence of tetrazolium chloride became discolored in three and one-half hours, while tryptose phosphate similarly inoculated took twenty-seven hours for discoloration. The tryptose phosphate does not possess a low oxidation-reduction potential. A medium possessing a low oxidation-reduction potential is more effective when employed in conjunction with this invention in liquid form than when employed in conjunction with an impregnated paper disc. Impregnating thioglycollate, tryptose, and a test paper previously impregnated with thioglycollate, with the same concentration of Neisseria, provided the following results:

TABLE I

| Nutrient | Time for Appreciable Discoloration |
| --- | --- |
| Thioglycollate | 2 hours. |
| Test Papers | 6 hours. |
| Tryptose | Not readable at 24 hours. |

Suitable for deposit in the testing chambers 17 are a wide variety of antibiotics such as triple sulfonamide, chloramphenicol, erythromycin, streptomycin, chlortetracycline, oxytetracycline, tetracycline, and penicillin. Inasmuch as the device and procedure outlined here permit evaluation of bacterial sensitivity to varying concentrations and combinations of antibiotics, the concentration and quality of the antibiotic can be varied widely. The antibiotic and indicator can be provided in liquid form and dehydrated in place in the testing chambers 17.

Best results in the use of the invention are achieved when the bacteria culture medium has a pH of about 7.6–7.7. Most bacteria culture media have a pH of about 7.2. Illustrative of this is the employment of blood serum (horse), in combination with thioglycollate. Blood itself is frequently used in a culture medium, but only for the diagnostic effect of being able to discern hemolysis of the red blood cells. The addition of serum through thioglycollate is effective to shift the pH upwardly through elimination of carbon dioxide.

Demonstrating the effectiveness of shifting pH in increasing the speed of the test is the following example:

*Example*

Four tests were performed, two of the tests employing thioglycollate and the other two employing thioglycollate plus 10 cc. of horse serum per 100 cc. of media. One thioglycollate-containing vessel was inoculated with alpha-Streptococci and one serum-thioglycollate-containing vessel was similarly inoculated. The remaining pair of vessels were inoculated with beta-Streptococci. The results obtained are shown in Table II below:

TABLE II

| Nutrient | Time of Discoloration, Alpha-Strep., hours | Time of Discoloration, Beta-Strep., hours |
| --- | --- | --- |
| Thioglycollate | 2 | 3 |
| Serum-Fortified Thioglycollate | 1½ | 1 |

I have found that this desirable increased rate of reduction can be achieved through a soluble proteinic material in place of the serum. Exemplary of the materials productive of this effect are lactalbumin, casein, and egg albumin. In addition to increasing the rate of reduction, the protein also produced another very desirable effect. The reduced indicator, which is red, is insoluble in thioglycollate medium alone, and it produces small red dots which increase in number as the bacteria continue reducing the indicator. This material eventually agglomerates and precipitates, so that all of the red color is in the bottom of the testing chambers 17 at the end of the test. When serum or soluble proteins are present, the reduced indicator actually appears dissolved in the medium. Thus, instead of achieving the dotted red appearance, a clear red color is obtained in the testing chambers 17. I have found that if the proteins are precipitated out of the medium, the red color goes with the protein, indicating that the reduced indicator is firmly adsorbed to the protein.

A modified form of the invention is seen in FIGS. 5–8, with the modified form of the device being seen in elevation in FIG. 5, wherein the device is designated generally by the numeral 110. The device 110, as was the case with the device 10, comprehends three parts. There is an outer tubular member 111, which telescopingly receives an inner tubular member 112, while the tubular member 112, at its upper end, is equipped with a plug closure 113.

Again, the outer tubular member 111 is equipped with an inner wall 114 which is positioned in sliding relation with the outer wall 115 of the inner tubular member 112. The annular space between the inner wall 114 and the outer wall 116 of the tubular member 110 is divided into a plurality of compartments 117 (see FIG. 7). Each compartment or chamber 117 communicates at its lower end with the inner bottom 119 of the outer tubular member 111 by virtue of an aperture 120 (this is best seen in FIG. 8).

The inner tubular member 112 is equipped with a tapered bottom wall 122, and this is equipped with an upward projection 123. As before, the projection 123 is equipped with an opening 124 at its apex. The projection 123 is engaged by a solid projection 125 which upstands from the central bottom of the outer tubular member 111. The projections 125 and 123 are equipped with cooperating threads designated 123a and 125a, respectively, and engagement of these threads is effective to bring the tapered lower portion 115a of the wall 115 into covering relation with the apertures 120.

Each of the chambers 117 is equipped with a platform element 117a, which is adapted to have deposited thereon an antibiotic 131.

In the operation of the device just described relative to FIGS. 5–8, the device 110 may be provided with a variety of antibiotics disposed on the various platforms 117a and with a nutrient medium 130 confined within the inner tubular member 112. Prior to use, the member 112 is telescopingly received within the member 111 in a fashion so as to seal off the flow passage 124. This confines the nutrient 130 to the inner tubular member 112. When there are bacteria to be tested, the plug-type cover 113 is removed and the bacteria introduced into the medium 130. Thereafter, the cap 113 is replaced and the inner tubular member 112 rotated relative to the outer tubular member 111 to the condition seen in FIG. 8. In FIG. 8, it will be noted that only a few of the threads 123a and 125a are engaged, which provides a tortuous passage for the medium 130 in flowing out of the inner tubular member 112 and into the chamber 117. Complete disengagement of the two sets of threads 123a and 125a would permit faster discharge, if desired. The disengagement of the threads, even to the partial disengagement seen in FIG. 8, results in the open upper end of the chambers 117 being exposed to the atmosphere, so that there is no pressure within the chambers 117 resisting the inflow of the bacteria-carrying nutrient medium 130.

Sufficient flow of the medium 130 is permitted until the level of the medium in each chamber 117 is just below the platforms 117a. Thereafter, the inner tubular member 112 is rotated in a reverse direction so as to completely engage the threads 123a and 125a and close off the apertures 120. Following this the device may be shaken to insure mixing of the antibiotics in the various media portions but without intermixing. The effectiveness of the antibiotic can be viewed through the transparent walls of the device.

While in the foregoing specification I have set forth a detailed description of embodiments of the invention for the purpose of illustration thereof, it will be apparent to those skilled in the art that many modifications in the details herein given may be made without departing from the spirit and scope of this invention.

I claim:

1. In a device for testing the sensitivity of bacteria to antibiotics, a container equipped with a storage chamber, a fluid medium in said chamber, a plurality of translucent testing chambers in said container, means for selectively isolating and communicating said testing chambers with said storage chamber, each of said testing chambers having deposited therein an antibiotic, and means for introducing bacteria into said storage chamber.

2. The structure of claim 1 in which each of said testing chambers is vertically elongated, the first-mentioned means comprising valve means adapted to communicate said chambers for gravity flow of said medium from said storage chamber into said testing chambers.

3. The structure of claim 2 in which said container comprises a pair of members arranged in telescoping relation, the inner of said members having an opening at the bottom thereof.

4. The structure of claim 3 in which the said members are equipped with cooperating threads and in which the inner member is equipped with a threadedly received closure for the upper end thereof, the said cooperating threads being oppositely oriented from the closure threads.

5. In a device for comparing the sensitivity of bacteria to various antibiotics, a plurality of vertically elongated translucent testing chambers each equipped with an antibiotic, a storage chamber containing a liquid bacterial nutrient medium, and means for selectively communicating said storage chamber with said testing chambers for gravity flow of said medium from said storage chamber, said means being effective to seal said testing chambers after said flow.

6. In a device for comparing the sensitivity of bacteria to various antibiotics, a container comprising inner and outer tubular members disposed in telescoped relation, said members being movable relative to each other to change the degree of telescoping, a liquid nutrient medium in said inner chamber, the upper end of said inner member being openably closed and the lower end thereof being equipped with an opening for liquid outflow, said outer member having its lower end closed and equipped with a plurality of ventable, translucent testing chambers in the side wall thereof communicating with the inner bottom of said outer member, an antibiotic in each of said testing chambers, said inner member being operative to isolate said testing chambers from said inner bottom.

7. In a device for comparing the sensitivity of bacteria to various antibiotics, a source of fluid medium inoculable with bacteria, a plurality of translucent walled chambers in selective communication with said source to receive bacteria-inoculated medium therefrom, each of said chambers having a deposit therein of an antibiotic and an indicator adapted to change color upon bacterial growth, and means for simultaneously flowing said fluid medium from said source into said chambers.

8. The structure of claim 7 in which said medium is effective to lower the oxidation-reduction potential of said indicator and said indicator comprises a triphenyl tetrazolium chloride.

9. The structure of claim 8 in which said medium pH is about 7.6.

10. The structure of claim 8 in which a proteinic material is dissolved in said medium.

11. A device for testing the sensitivity of bacteria to various antibiotics, comprising inner and outer tubular members arranged in telescoping relation, the said outer member being equipped with inner and outer walls, said outer walls being translucent, divider means extending between said walls providing a plurality of testing compartments, aperture means in said inner wall communicating said compartments with the interior of said outer member, each of said compartments having deposited therein an antibiotic and equipped with vent means, said inner member having a portion extending beyond said outer member when the two are telescoped, said portion closing said vent means, said inner member containing a bacterial nutrient medium.

12. The structure of claim 11 in which the said medium is a thioglycollate medium having a proteinic material dissolved therein and having a pH of about 7.6, the said antibiotic having a tetrazolium compound associated therewith.

13. The structure of claim 11 in which the said portion is equipped with threads mating with threads on said outer wall.

14. In a device for comparing the sensitivity of bacteria to various antibiotics, a container comprising inner and outer tubular members disposed in telescoping relation, said members being movable relative to each other to change the degree of telescope, a liquid nutrient medium in said inner member, the upper end of said inner member being openably closed and the lower end thereof being equipped with an internally threaded projection providing an outlet flow passage, said outer member having spaced-apart concentric walls defining a plurality of translucent testing chambers and having an upwardly-extending, outwardly-threaded projection in the central bottom thereof, the inner of said concentric walls being equipped with flow passages adapted to be closed by said inner member when the same is threadedly received upon the upwardly-extending projection of said outer member, each of said testing chambers having deposited therein an antibiotic.

15. The structure of claim 14 in which the lower ends of said inner member and said inner concentric wall are inwardly tapered.

16. In a test device of the character described, a container equipped with a storage chamber, a fluid medium in said chamber, a plurality of translucent testing chambers in said container, means for communicating said testing chambers and thereafter isolating all of said chambers with said storage chamber, each of said testing chambers having deposited therein a different test material, and means for introducing a material to be tested into said storage chamber.

17. In a test device, a body having a plurality of vertically elongated, translucent testing chambers, each having a different test material deposited thereon, a storage chamber in said body containing a liquid dispersion medium, and means coupled to said body for selectively communicating said storage chamber with said testing chambers for gravity flow of said medium from said storage chamber, said means being effective to seal said testing chambers after said flow.

18. In a test device, a source of fluid medium adapted to receive material to be tested, a plurality of translucent walled chambers in selective communication with said source to receive said medium therefrom, each of said chambers having a deposit therein of a different test material, means for simultaneously flowing said fluid medium from said source into said chambers, and thereafter for isolating said chambers and a colorimetric indicator sensitive to said material to be tested.

References Cited in the file of this patent

UNITED STATES PATENTS

| | | |
|---|---|---|
| 2,689,204 | Nickerson | Sept. 14, 1954 |
| 2,761,813 | Goetz | Sept. 4, 1956 |
| 2,771,399 | Savage | Nov. 20, 1956 |
| 2,787,581 | Scherr | Apr. 2, 1957 |
| 2,792,331 | Boxell | May 26, 1957 |
| 2,854,384 | Beakley et al. | Sept. 30, 1958 |
| 2,950,202 | Brockmann | Aug. 23, 1960 |
| 2,968,597 | Pagano et al. | Jan. 17, 1961 |

OTHER REFERENCES

Difco Manual, pub. by Difco Laboratories Inc., Detroit, Michigan (1953), p. 199.